(12) United States Patent
Seo et al.

(10) Patent No.: US 11,180,590 B2
(45) Date of Patent: Nov. 23, 2021

(54) COPOLYMER AND PREPARATION METHOD THEREFOR

(71) Applicant: LG CHEM, LTD., Seoul (KR)

(72) Inventors: Jae Bum Seo, Daejeon (KR); Dae Woo Lee, Daejeon (KR); Jung Tae Park, Daejeon (KR); Gyu Sun Kim, Daejeon (KR); Ji Uk Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 96 days.

(21) Appl. No.: 16/339,705

(22) PCT Filed: Jul. 26, 2018

(86) PCT No.: PCT/KR2018/008490
§ 371 (c)(1),
(2) Date: Apr. 4, 2019

(87) PCT Pub. No.: WO2019/022544
PCT Pub. Date: Jan. 31, 2019

(65) Prior Publication Data
US 2020/0040115 A1 Feb. 6, 2020

(30) Foreign Application Priority Data

Jul. 28, 2017 (KR) .................. 10-2017-0096332
Jul. 25, 2018 (KR) .................. 10-2018-0086811

(51) Int. Cl.
*C08F 212/08* (2006.01)
*C08F 220/18* (2006.01)
(Continued)

(52) U.S. Cl.
CPC .............. *C08F 212/08* (2013.01); *C08F 2/02* (2013.01); *C08F 6/10* (2013.01); *C08F 6/28* (2013.01);
(Continued)

(58) Field of Classification Search
CPC .. C08F 212/08; C08F 2/02; C08F 6/10; C08F 6/28; C08F 220/44; C08F 220/10;
(Continued)

(56) References Cited

U.S. PATENT DOCUMENTS 4,618,663 A * 10/1986 Nakagawa ............ C08F 212/12
526/232.3
4,877,833 A * 10/1989 Kondo .................... C08L 35/06
525/64

(Continued)

FOREIGN PATENT DOCUMENTS

CN 1854160 A 11/2006
EP 3127927 A1 2/2017
(Continued)

OTHER PUBLICATIONS

KR-20100051368-A, Machine Translation, May 2010 (Year: 2010).*
(Continued)

*Primary Examiner* — Satya B Sastri

(57) ABSTRACT

The present invention relates to a copolymer including 20 to 65 wt % of units derived from an alkyl styrene-based monomer; 10 to 40 wt % of units derived from a (meth) acrylate-based monomer; and 20 to 40 wt % of units derived from vinyl cyan-based monomer, based on the total weight of the copolymer, wherein the residual monomer content is 780 ppm or less, and a method for preparing the same.

5 Claims, 1 Drawing Sheet

(51) Int. Cl.
*C08F 220/44* (2006.01)
*C08F 2/02* (2006.01)
*C08F 6/10* (2006.01)
*C08F 6/28* (2006.01)
*C08F 222/40* (2006.01)

(52) U.S. Cl.
CPC .......... *C08F 220/18* (2013.01); *C08F 220/44* (2013.01); *C08F 222/40* (2013.01); *C08F 220/1803* (2020.02)

(58) Field of Classification Search
CPC ........ C08F 220/12; C08F 220/18–1818; C08F 222/40; C08F 222/1803
See application file for complete search history.

(56) References Cited

U.S. PATENT DOCUMENTS

| | | | | |
|---|---|---|---|---|
| 5,010,138 | A | * | 4/1991 | Westeppe ............ C08G 81/028 525/179 |
| 5,191,046 | A | * | 3/1993 | Iwamoto ............... C08F 212/04 526/262 |
| 5,283,286 | A | | 2/1994 | Takahashi et al. |
| 5,489,657 | A | * | 2/1996 | Sue ........................ C08F 2/02 525/282 |
| 5,948,546 | A | | 9/1999 | Bafford et al. |
| 6,211,331 | B1 | * | 4/2001 | Craig ...................... B01D 3/06 264/85 |
| 9,777,088 | B2 | * | 10/2017 | Kang ................... C08F 279/04 |
| 2006/0241277 | A1 | | 10/2006 | Chun et al. |
| 2015/0376316 | A1 | * | 12/2015 | Heo ...................... C08F 212/12 526/233 |
| 2017/0121436 | A1 | | 5/2017 | Kang et al. |

FOREIGN PATENT DOCUMENTS

| | | | |
|---|---|---|---|
| JP | 2941485 B2 | | 8/1999 |
| KR | 100055367 B | | 10/1992 |
| KR | 960002983 B1 | | 3/1996 |
| KR | 20060101574 A | * | 9/2006 |
| KR | 20080035214 A | | 4/2008 |
| KR | 100828717 B | | 5/2008 |
| KR | 20100051368 A | | 5/2010 |
| KR | 20100051368 A | * | 5/2010 |
| KR | 20100062417 A | | 6/2010 |
| KR | 20120042802 A | | 5/2012 |
| KR | 20150143020 A | | 12/2015 |
| KR | 20160001270 A | | 1/2016 |
| KR | 101604518 B1 | | 3/2016 |
| KR | 20160127387 A | | 11/2016 |
| WO | WO-2016175423 A1 * | | 11/2016 ............. C08L 25/12 |

OTHER PUBLICATIONS

KR-20060101574-A, Machien Translation, Sep. 2006 (Year: 2006).*
International Search Report issued in related PCT Application PCT/KR2018/008490 dated Oct. 29, 2018.
"Concise Handbook of Raw Materials and Equipments in Rubber Industry (Version 2016)", Beijing Institute of Technology Press, Nov. 2016.

* cited by examiner

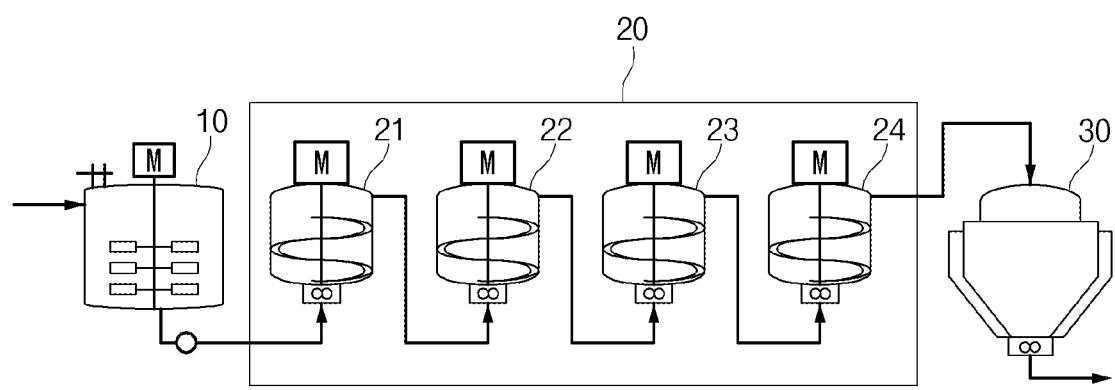

COPOLYMER AND PREPARATION METHOD THEREFOR

TECHNICAL FIELD

Cross-Reference to Related Applications

The present application is a U.S. National Stage of PCT/KR2018/008490, filed on Jul. 26, 2018, which claims the benefit of priority based on Korean Patent Application Nos. 10-2017-0096332, filed on Jul. 28, 2017, and 10-2018-0086811, filed on Jul. 25, 2018, the entire contents of which are incorporated herein by reference.

Technical Field

The present invention relates to a copolymer and a method for preparing the same, and a copolymer including a units derived from an alkyl styrene-based monomer, units derived from a (meth)acrylate-based monomer, and units derived from a vinyl cyan-based monomer, and having the residual monomer content of 780 ppm or less, and a method for preparing the same.

BACKGROUND ART

Generally, a styrene-based copolymer has excellent moldability, stiffness, and electrical properties, and is widely used in various industrial fields including OA products such as a computer, a printer and a copy machine, home appliances such as television and an audio system, automobile parts, and miscellaneous goods. Due to excellent heat resistance, the styrene-based copolymer is more usefully used in fields requiring heat resistance such as the housing of home appliances and the interior materials of automobiles.

For the preparation of such heat resistant styrene-based copolymer, α-methylstyrene which may serve excellent heat resistance is being used. However, since α-methylstyrene has a low depolymerization temperature, if the temperature is elevated during performing polymerization reaction, the copolymer may be decomposed to increase the generation of an oligomer and to rather decrease heat resistance. Accordingly, the polymerization reaction for preparing a styrene-based copolymer using α-methyl styrene is required to be carried out at a markedly lower temperature than the polymerization temperature of a common styrene-based copolymer, but in this case, a polymerization rate is decreased, a polymerization time is extended and a polymerization conversion ratio is markedly decreased. Thus, the molecular weight of the polymer thus prepared is small and the thermal decomposition thereof is liable to arise.

To solve these limitations, a method of increasing reaction retention time or using an excessive amount of an initiator has been suggested. In this case, defects of deteriorating productivity or changing the color of a copolymer arise. In addition, if an excessive amount of an initiator is used, the molecular weight of a copolymer is decreased, and the defective proportion of final heat resistance resin products is increased during extrusion molding.

Accordingly, research on a styrene-based copolymer that may improve the low depolymerization temperature of an α-methylstyrene, not degrade the mechanical and chemical properties of the styrene-based copolymer, and be prepared as a polymer, is being continued.

DISCLOSURE OF THE INVENTION

Technical Problem

An object of the present invention is to provide a copolymer having high purity and weight average molecular weight, and excellent scratch resistance, heat resistance and coloring properties, and a method for preparing the same.

Technical Solution

To solve the above-described task, there is provided in the present invention a copolymer comprising 20 to 65 wt % of units derived from an alkyl styrene-based monomer; 10 to 40 wt % of units derived from a (meth)acrylate-based monomer; and 20 to 40 wt % of units derived from a vinyl cyan-based monomer, based on a total weight of the copolymer, wherein the residual monomer content is 780 ppm or less.

According to another aspect of the present invention, there is provided a method for preparing a copolymer, including performing continuous bulk polymerization of a monomer mixture in four or more reactors; and volatilizing unreacted monomers and solvent from the polymerization product obtained by polymerization reaction in a devolatilization bath to separate a polymer, wherein the monomer mixture comprises 20 to 65 wt % of an alkyl styrene-based monomer, 10 to 40 wt % of a (meth)acrylate-based monomer, and 20 to 40 wt % of a vinyl cyan-based monomer, based on a total weight of the monomer mixture, and the devolatilization bath has a temperature of 223 to 252° C., and a pressure of 20 torr or less.

Advantageous Effects

The copolymer according to the present invention has high purity and shows particularly excellent improving effect of heat resistance. In addition, since scratch resistance and coloring properties are excellent, and a weight average molecular weight is high, excellent processability is achieved. If such a copolymer is blended with another resin, a molded article having excellent scratch resistance, heat resistance and mechanical properties, and high gloss may be manufactured.

BRIEF DESCRIPTION OF THE DRAWING

FIG. 1 illustrates a process system that may perform the preparation method of a copolymer according to an embodiment of the present invention.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the present invention, the residual monomer means unreacted monomers included in the copolymer, and if the content of the residual monomer included in the copolymer is decreased, a copolymer with high purity may be prepared.

In the present invention, the content of the residual monomer may be measured by gel permeation chromatography using a supernatant obtained after dissolving the copolymer in a chloroform solution and depositing in methanol.

In the present invention, the weight average molecular weight may be measured as a relative value with respect to a standard polystyrene (PS) specimen using gel permeation chromatography (GPC, waters breeze) and a tetrahydrofuran (THF) eluent.

In the present invention, a polymerization conversion ratio represents the polymerization conversion ratio of a monomer mixture, that is, the degree of forming a polymer via the polymerization of monomers included in the monomer mixture, and may be calculated by the equation below.

Polymerization conversion ratio (%)=(total weight of initially injected monomer mixture−total weight of unreacted monomers mixture)/(total weight of initially injected monomer mixture)×100

In the present invention, pencil hardness may be measured via measuring scratch resistance by fixing a pencil at an angle of 45° with a load of 0.5 kg, scratching the surface of the extruded specimen using pencils by hardness, and checking whether the surface is scratched with the naked eye.

In the present invention, the glass transition temperature may be measured using a differential scanning calorimetry (manufacturer: Ta Instruments, trade name: DSC Q20).

In the present invention, refractive index may be measured using an Abbe refractometer at 25° C. based on ASTM D542.

Generally, since the polymerization temperature of an alkyl styrene-based monomer is very low, the preparation of a copolymer using the alkyl styrene-based monomer requires a slow polymerization rate and long reaction time. In addition, the weight average molecular weight of the polymer thus produced may be small and the thermal decomposition thereof may easily occur.

In order to overcome such defects, in the present invention, during preparing a copolymer using an alkyl styrene-based monomer, an alkyl styrene-based monomer, a (meth)acrylate-based monomer and a vinyl cyan-based monomer are injected at certain amounts, and continuous bulk polymerization is performed at a low temperature to minimize the generation of an oligomer to increase a weight average molecular weight. In addition, by removing residual monomers utilizing a devolatilization bath having appropriate temperature and pressure, the purity of a copolymer may be increased and a copolymer having excellent heat resistance, scratch resistance and coloring properties may be prepared.

The copolymer according to an embodiment of the present invention includes 20 to 65 wt % of units derived from an alkyl styrene-based monomer; 10 to 40 wt % of the units derived from a (meth)acrylate-based monomer; and 20 to 40 wt % of units derived from a vinyl cyan-based monomer, based on the total weight of the copolymer, wherein the residual monomer content is 780 ppm or less.

The copolymer preferably includes 30 to 65 wt % of the units derived from the alkyl styrene-based monomer; 15 to 40 wt % of the units derived from the (meth)acrylate-based monomer; and 20 to 40 wt % of the units derived from the vinyl cyan-based monomer, based on the total weight of the copolymer, wherein the residual monomer content is 780 ppm or less.

Since the copolymer includes the units and the residual monomer in the above-mentioned ranges, a copolymer having excellent heat resistance, scratch resistance and coloring properties, and high weight average molecular weight and purity may be prepared.

Specifically, heat resistance may be improved due to the units derived from the alkyl styrene-based monomer, and scratch resistance and coloring properties may be improved due to the units derived from the (meth)acrylate-based monomer. In addition, mechanical properties may be improved and appropriate reactively may be kept due to the units derived from the vinyl cyan-based monomer.

The weight average molecular weight of the copolymer may be increased by the continuous bulk polymerization of a polymerization solution including the monomers at 100 to 120° C., preferably, 105 to 115° C.

The content of the residual monomer of the copolymer may be decreased to 780 ppm or less, preferably, 750 ppm or less, more preferably, 700 ppm or less, based on the total weight of the copolymer without damaging the copolymer by controlling the temperature to 223 to 252° C. and the pressure to 20 torr or less in the devolatilization bath, which will be explained later, preferably, the temperature to 225 to 250° C. and the pressure to 18 torr or less, more preferably, the temperature to 230 to 245° C. and the pressure to 15 torr or less, thereby increasing purity.

However, if any one among the units in the copolymer does not satisfy the above-mentioned range, all the effects may not be achieved.

Particularly, if the amount included of the units derived from the alkyl styrene-based monomer is greater than the above-mentioned range, the copolymer may be easily decomposed by heat, the weight average molecular weight may be decreased, and scratch resistance may be degraded. In addition, a large amount of oligomers may be produced during the preparation, and the processability of the copolymer may be degraded, the residual monomer in the copolymer may increase, the purity may be decreased, and mechanical properties may be degraded.

If the units derived from the alkyl styrene-based monomer is included at an amount less than the above-mentioned range, heat resistance of the copolymer may be degraded and thermal discoloration may arise.

If the units derived from the (meth)acrylate-based monomer is included at an amount greater than the above-mentioned range, the additional improving effect of scratch resistance may be insignificant.

If the units derived from the (meth)acrylate-based monomer is included at an amount less than the above-mentioned range, scratch resistance and coloring properties may be degraded.

If the units derived from the vinyl cyan-based monomer is included at an amount greater than the above-mentioned range, the thermal discoloration of the copolymer may arise, and a large amount of a gel polymer which is insoluble in a polymerization solution during bulk polymerization may be produced.

If the units derived from the vinyl cyan-based monomer is included at an amount less than the above-mentioned range, the reactivity may be degraded, and the polymerization conversion ratio and polymerization rate of the monomers may be decreased.

The units derived from the alkyl styrene-based monomer may be units derived from one or more selected from the group consisting of α-methylstyrene and α-ethylstyrene, and among them, the units derived from α-methylstyrene is preferable.

The units derived from the (meth)acrylate-based monomer may be units derived from one or more selected from the group consisting of acrylate, methyl acrylate, ethyl acrylate, propyl acrylate, methacrylate, methyl methacrylate, ethyl methacrylate, and propyl methacrylate, and among them, the units derived from methyl methacrylate is preferable.

The units derived from a vinyl cyan-based monomer may be units derived from one or more selected from the group consisting of acrylonitrile, methacrylonitrile, phenyl acrylonitrile, and α-chloro acrylonitrile, and among them, the units derived from acrylonitrile is preferable.

The weight average molecular weight of the copolymer may be from 75,000 to 120,000 g/mol, preferably, from 80,000 to 115,000 g/mol.

If the above-mentioned range is satisfied, processability during processing the copolymer into a molded article may be improved.

The copolymer may have a pencil hardness of H or more, preferably, from H to 3H.

If the above-mentioned range is satisfied, scratch resistance may become excellent.

The copolymer may have the glass transition temperature of 120° C. or more, preferably, 120 to 130° C.

If the above-mentioned range is satisfied, heat resistance may become excellent.

The copolymer may have a refractive index of 1.6 or less, preferably, 1.5 to 1.6.

If the above-mentioned range is satisfied, coloring properties may become excellent.

Meanwhile, the copolymer according to an embodiment of the present invention may further include 0.5 to 10 wt % of units derived from a maleimide-based monomer, based on the total weight of the copolymer, to further improve heat resistance.

In addition, if the units derived from the maleimide-based monomer are included in the copolymer, the residual monomer content may be controlled to 700 ppm or less, preferably, 650 ppm or less, more preferably, 600 ppm or less, based on the total weight of the copolymer.

By further including the units derived from the maleimide-based monomer, the amounts of the remaining units may be controlled, and in this case, the copolymer may preferably include 20 to 55 wt % of the units derived from the alkyl styrene-based monomer; 15 to 40 wt % of the units derived from the (meth)acrylate-based monomer; 20 to 35 wt % of the units derived from the vinyl cyan-based monomer; and 0.8 to 10 wt % of the units derived from the maleimide-based monomer, based on the total weight of the copolymer.

Since the copolymer includes the units in the above-mentioned ranges, a copolymer having further improved heat resistance, excellent scratch resistance and coloring properties, and high weight average molecular weight and purity may be prepared.

However, if the repeating units derived from the maleimide-based monomer is included in an amount greater than the above-mentioned range, scratch resistance and coloring properties may be degraded, and if the amount is less than the above-mentioned range, the improving effect of heat resistance may not be achieved.

In order to maximize heat resistance improvement, the copolymer may preferably include 20 to 45 wt % of the units derived from the alkyl styrene-based monomer; 15 to 40 wt % of the units derived from the (meth)acrylate-based monomer; 20 to 35 wt % of the units derived from the vinyl cyan-based monomer; and 5 to 10 wt % of the units derived from the maleimide-based monomer, based on the total weight of the copolymer.

In order to maximize the improving effects of scratch resistance and coloring properties, the copolymer may preferably include 40 to 45 wt % of the units derived from the alkyl styrene-based monomer; 15 to 30 wt % of the units derived from the (meth)acrylate-based monomer; 20 to 30 wt % of the units derived from the vinyl cyan-based monomer; and 0.8 to 5 wt % of the units derived from the maleimide-based monomer, based on the total weight of the copolymer.

The units derived from the maleimide-based monomer may be units derived from one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl) maleimide, 2-methyl-N-phenyl maleimide, N-(4-bromophenyl) maleimide, N-(4-nitrophenyl) maleimide, N-(4-hydroxyphenyl) maleimide, N-(4-methoxyphenyl) maleimide, N-(4-carboxyphenyl) maleimide and N-benzyl maleimide, and among them, the units derived from N-phenylmaleimide is preferable.

If the copolymer further includes the units derived from the maleimide-based monomer, the weight average molecular weight may be from 85,000 to 115,000 g/mol, preferably, from 90,000 to 110,000 g/mol.

If the above-mentioned range is satisfied, processability during processing the copolymer into a molded article may be improved.

If the copolymer further includes the units derived from the maleimide-based monomer, the copolymer may have a pencil hardness of H or more, preferably, from H to 3H.

If the above-mentioned range is satisfied, scratch resistance may be improved.

If the copolymer further includes the units derived from the maleimide-based monomer, the copolymer may have the glass transition temperature of 125° C. or more, preferably, 125 to 140° C.

If the above-mentioned range is satisfied, heat resistance may be improved.

The copolymer may have a refractive index of 1.6 or less, preferably, 1.5 to 1.6.

If the above-mentioned range is satisfied, coloring properties may become excellent.

Here, the monomer mixture may further include 0.5 to 10 wt % of a maleimide-based monomer, based on the total weight of the monomer mixture.

The method for preparing a copolymer according to an embodiment of the present invention comprises performing continuous bulk polymerization of a monomer mixture in four or more reactors; and volatilizing unreacted monomers and solvent from the polymerization product obtained by polymerization reaction in a devolatilization bath to separate a polymer, wherein the monomer mixture includes 20 to 65 wt % of an alkyl styrene-based monomer, 10 to 40 wt % of a (meth)acrylate-based monomer, and 20 to 40 wt % of a vinyl cyan-based monomer, based on a total weight of the monomer mixture, wherein the devolatilization bath has a temperature of 223 to 252° C., and a pressure of 20 torr or less.

Here, the monomer mixture may further include 0.5 to wt % of a maleimide-based monomer, based on the total weight of the monomer mixture.

The explanation on the constituent elements and compositions of the monomer mixture is the same as that referring to the copolymer.

An initiator and a solvent may be further injected into the reactor.

The initiator may be any one which is capable of increasing the stability of polymerization reaction and appropriately controlling the weight average molecular weight and the polymerization conversion ratio of a copolymer, without specific limitation.

The initiator may be one or more selected from the group consisting of 1,1-bis(t-butylperoxy)cyclohexane, 1,1-bis(t-butylperoxy)-2-methylcyclohexane, 1,1-bis(t-butylperoxy)-3,3,5-trimethylcyclohexane and 2,2-bis(t-butylperoxy)butane, and among them, 1,1-bis(t-butylperoxy) cyclohexane is preferable.

The initiator may be included in an amount of 0.05 to 3 parts by weight with respect to 100 parts by weight of the monomer mixture. If the above-mentioned range is satisfied, the weight average molecular weight and the polymerization conversion ratio of the copolymer may be appropriately controlled.

The solvent may be an inert organic solvent, particularly, various alcohols; ketones such as methyl ethyl ketone; aromatic hydrocarbons such as petroleum ether, ethylbenzene and toluene; or halides such as carbon tetrachloride and chloroform.

The solvent may be appropriately controlled considering the viscosity decrease in a polymerization reaction system, particularly, may be used in an amount of 10 parts by weight or less, more particularly, 1 to 10 parts by weight, with respect to 100 parts by weight of the monomer mixture.

The continuous bulk polymerization may be a continuous bulk polymerization by which a monomer mixture including monomers to be polymerized is continuously injected using continuous reactors where four or more reactors, particularly, four or more stirring baths are connected in series. If the continuous bulk polymerization is performed by the above-mentioned method, the polymerization conversion ratio may increase and the residual monomer content may favorably decrease.

In addition, the continuous bulk polymerization may be performed at 100 to 120° C., or 105 to 115° C., and among them, may preferably be performed at 105 to 115° C.

If the above-mentioned temperature is satisfied, a copolymer having a high weight average molecular weight may be prepared, process efficiency may be improved, and the generation of oligomers may be restrained.

The devolatilization bath may have a temperature of 225 to 250° C. and a pressure of 18 torr or less, or a temperature of 230 to 245° C. and a pressure of 15 torr or less, and preferably among them, a temperature of 230 to 245° C. and a pressure of 15 torr or less.

If the temperature and pressure of the devolatilization bath satisfy the above-mentioned conditions, a polymer may be separated by volatilizing unreacted monomers and solvents included in the polymer product. In addition, a copolymer having remarkably low degree of the residual monomer content of 780 ppm or less, i.e., a copolymer having high purity may be prepared when compared with a copolymer prepared by emulsion polymerization or suspension polymerization.

However, if the temperature of the devolatilization bath is greater than the above-mentioned temperature, due to the depolymerization of the units derived from the alkyl styrene-based monomer, the residual monomer content is rather increased, and if the temperature is less than the above-mentioned temperature, the efficiency of the devolatilization bath volatilizing unreacted monomers and solvents may be decreased, thereby increasing the content of the residual monomer.

In addition, if the pressure of the devolatilization bath is greater than the above-mentioned pressure, the efficiency of the devolatilization bath volatilizing unreacted monomers and solvents is decreased, thereby increasing the residual monomer content.

Meanwhile, FIG. 1 illustrates a process system which may perform the method for preparing a copolymer according to an embodiment of the present invention.

Referring to FIG. 1, a process system (100) according to an embodiment of the present invention may include a mixing bath (10) where a polymerization solution may be prepared, a polymerization bath (20) where a polymerization reaction may be performed, and a devolatilization bath (30) where a devolatilization process may be performed, wherein the polymerization bath (20) may be a continuous bulk polymerization reactor in which a first polymerization reactor (21), a second polymerization reactor (22), a third polymerization reactor (23) and a fourth polymerization reactor (24) are continuously arranged.

Particularly, the polymerization solution may be prepared in the mixing bath (10). The polymerization solution may be prepared by injecting an alkyl styrene-based monomer, a (meth)acrylate-based monomer, a vinyl cyan-based monomer, a maleimide-based monomer, a solvent and an initiator into the mixing bath (10) and then, completely dissolving them. In this case, the mixing bath (10) may include a stirrer in the inside thereof.

The bulk polymerization may be performed in the polymerization bath (20) in which the first polymerization reactor (21), the second polymerization reactor (22), the third polymerization reactor (23) and the fourth polymerization reactor (24) are continuously arranged. The polymerization solution may be transported from the mixing bath (10) to the first polymerization reactor (21), and polymerized at a temperature of 100 to 120° C. for 1.5 hours to 2.5 hours to perform a first polymerization step. In this case, the polymerization solution may be transported into the first polymerization reactor (21) at a flow rate of 5 kg/hr to 10 kg/hr, and due to the transportation with this flow rate, the retention time in the first polymerization reactor may be controlled to 2.5 to 4.5 hours. In this case, the retention time in the first polymerization reactor may represent the polymerization time in the first polymerization reactor. A first polymerization reaction product after the first polymerization step is transported to the second polymerization reactor (22) and polymerized at a temperature of 100 to 120° C. for 1.5 to 3.0 hours to perform a second polymerization step. Then, a second polymerization reaction product after the second polymerization step is transported to a third polymerization reactor (23) and polymerized at a temperature of 100 to 120° C. for 1.5 to 3.0 hours to perform a third polymerization. A third polymerization reaction product after the third polymerization step is transported to a fourth polymerization reactor (24) and polymerized at a temperature of 100 to 120° C. for 1.5 to 3.0 hours to produce a polymerization product.

In the devolatilization bath (30), the devolatilization of the polymerization product may be performed. The polymerization product may be transported from the fourth polymerization reactor (24) to the devolatilization bath (30) and devolatilized at a temperature of 223 to 252° C. under pressure conditions of 20 torr or less to obtain a copolymer. In the devolatilization bath (30), a heat exchanger may be installed.

MODE FOR CARRYING OUT THE INVENTION

Hereinafter, embodiments of the present invention will be described in detail so that a person skilled in the art may easily perform. However, the present invention may be accomplished as various different types, and is not limited to the embodiments explained herein below.

<Preparation of Copolymer>

Examples 1 to 13, and Comparative Examples 1 to 13

95 parts by weight of a monomer mixture including the monomer described in Table 1 below, 5 parts by weight of toluene as a reaction solvent, and 0.1 parts by weight of 1,1-bis(t-butyloxy)cyclohexane as an initiator were added to prepare a polymerization solution. The polymerization solution was injected at a rate of 7 kg/hr into a 26 L, first polymerization reactor to perform first bulk polymerization at 110° C., then, injected into a 16 L, second polymerization reactor to perform second bulk polymerization at 110° C., then, injected into a 16 L, third polymerization reactor to perform third bulk polymerization at 110° C., and then, injected into a 16 L, fourth polymerization reactor to perform fourth bulk polymerization at 110° C. to finish continuous bulk polymerization. After that, unreacted monomers and reaction solvents were recovered and removed from the devolatilization bath at the temperature and pressure described in Table 1 to prepare a copolymer having a pellet shape.

TABLE 1

| Division | AMS (wt %) | MMA (wt %) | AN (wt %) | PMI (wt %) | Styrene (wt %) | Devolatilization bath temperature (° C.) | Devolatilization bath pressure (torr) |
|---|---|---|---|---|---|---|---|
| Example 1 | 55.00 | 15.00 | 30.00 | — | — | 235 | 15 |
| Example 2 | 45.00 | 25.00 | 30.00 | — | — | 235 | 15 |
| Example 3 | 30.00 | 40.00 | 30.00 | — | — | 235 | 15 |
| Example 4 | 65.00 | 15.00 | 20.00 | — | — | 235 | 15 |
| Example 5 | 45.00 | 15.00 | 40.00 | — | — | 235 | 15 |
| Example 6 | 55.00 | 15.00 | 30.00 | — | — | 225 | 15 |
| Example 7 | 55.00 | 15.00 | 30.00 | — | — | 250 | 15 |
| Example 8 | 55.00 | 10.00 | 35.00 | — | — | 235 | 15 |
| Example 9 | 44.44 | 16.67 | 33.33 | 5.56 | — | 235 | 15 |
| Example 10 | 20.00 | 40.00 | 30.00 | 10.00 | — | 235 | 15 |
| Example 11 | 43.69 | 29.13 | 24.27 | 2.91 | — | 235 | 15 |
| Example 12 | 51.89 | 18.87 | 28.30 | 0.94 | — | 235 | 15 |
| Example 13 | 41.67 | 29.76 | 23.81 | 4.76 | — | 235 | 15 |
| Comparative Example 1 | 70.00 | — | 30.00 | — | — | 235 | 15 |
| Comparative Example 2 | — | 70.00 | 30.00 | — | — | 235 | 15 |
| Comparative Example 3 | — | 100.00 | — | — | — | 235 | 15 |
| Comparative Example 4 | 55.00 | 15.00 | 30.00 | — | — | 220 | 15 |
| Comparative Example 5 | 55.00 | 15.00 | 30.00 | — | — | 235 | 25 |
| Comparative Example 6 | 55.00 | 15.00 | 30.00 | — | — | 255 | 15 |
| Comparative Example 7 | 60.000 | 5.00 | 35.00 | — | — | 235 | 15 |
| Comparative Example 8 | 59.09 | 9.09 | 22.73 | 9.09 | — | 235 | 15 |
| Comparative Example 9 | 45.00 | 30.00 | 10.00 | 15.00 | — | 235 | 15 |
| Comparative Example 10 | — | 9.09 | 22.73 | 9.09 | 59.09 | 235 | 15 |
| Comparative Example 11 | 44.44 | 16.67 | 33.33 | 5.56 | — | 235 | 25 |
| Comparative Example 12 | 44.44 | 16.67 | 33.33 | 5.56 | — | 220 | 15 |
| Comparative Example 13 | 44.44 | 16.67 | 33.33 | 5.56 | — | 255 | 15 |

AMS: α-methylstyrene
MMA: methyl methacrylate
AN: acrylonitrile
PMI: N-phenylmaleimide

Comparative Example 14

100 parts by weight of distilled water, 55 parts by weight of α-methylstyrene, 30 parts by weight of acrylonitrile, and 15 parts by weight of methyl methacrylate were mixed, and 1 part by weight of tri-calcium phosphate as a dispersant and 0.03 parts by weight of benzoyl peroxide as an initiator were added thereto, followed by performing suspension polymerization at 90° C. for 5 hours. After polymerization, washing and drying were performed to prepare a resin with a bead shape.

Comparative Example 15

100 parts by weight of distilled water, 55 parts by weight of α-methylstyrene, 30 parts by weight of acrylonitrile, and 15 parts by weight of methyl methacrylate were mixed, and 1 part by weight of fatty acid soap as an emulsifier and 0.03 parts by weight of benzoyl peroxide as an initiator were added thereto, followed by performing emulsion polymerization at 90° C. for 5 hours. After polymerization, washing and drying were performed to prepare a resin with a powder shape.

Experimental Example 1

The physical properties of the copolymers of the Examples and the Comparative Examples were measured by the methods below, and the results are shown in Table 2 below.

1) Residual monomer (ppm): a copolymer was dissolved in a chloroform solution and deposited in methanol, and the supernatant was used for the measurement by gel permeation chromatography.

2) Polymerization conversion ratio (%)=(total weight of initially injected monomer mixture−total weight of unreacted monomers mixture)/(total weight of initially injected monomer mixture)×100

3) Weight average molecular weight (g/mol): measured as a relative value with respect to a standard polystyrene (PS) specimen through GPC (water breeze) using THF as an eluent.

4) Pencil hardness: scratch resistance was measured by fixing a pencil at an angle of 45° with a load of 0.5 kg, scratching the surface of the extruded specimen using pencils by hardness, and checking whether the surface is scratched with the naked eye.

5) Refractive index: measured using an Abbe refractometer at 25° C. based on ASTM D542.

6) Glass transition temperature (° C.): measured using differential scanning calorimetry (manufacturer: Ta Instruments, trade name: DSC Q20).

TABLE 2

| Division | Residual monomer (ppm) | Polymerization conversion ratio (%) | Weight average molecular weight | Pencil hardness | Refractive index | Glass transition temperature (° C.) |
|---|---|---|---|---|---|---|
| Example 1 | 610 | 56.6 | 92,500 | H | 1.5590 | 125 |
| Example 2 | 600 | 60.2 | 95,000 | 2H | 1.5460 | 123 |
| Example 3 | 590 | 64.5 | 100,500 | 2H | 1.5380 | 121 |
| Example 4 | 690 | 52.8 | 85,000 | H | 1.5680 | 124 |
| Example 5 | 610 | 65.6 | 107,000 | H | 1.5480 | 123 |
| Example 6 | 645 | 57.1 | 92,800 | H | 1.5588 | 124 |
| Example 7 | 533 | 56.3 | 92,100 | H | 1.5191 | 125 |
| Example 8 | 605 | 63.2 | 94,500 | H | 1.5590 | 125 |
| Example 9 | 590 | 68.3 | 91,000 | H | 1.5510 | 131 |
| Example 10 | 570 | 70.8 | 101,000 | 2H | 1.5330 | 138 |
| Example 11 | 530 | 62.1 | 92,500 | 2H | 1.5140 | 130 |
| Example 12 | 550 | 57.7 | 90,300 | 2H | 1.5148 | 127 |
| Example 13 | 590 | 63.0 | 94,600 | 2H | 1.5141 | 129 |
| Comparative Example 1 | 780 | 51.1 | 76,000 | F | 1.5330 | 124 |
| Comparative Example 2 | 890 | 52.2 | 79,000 | 2H | 1.5830 | 112 |
| Comparative Example 3 | 1,200 | 75.4 | 73,000 | 2H | 1.5010 | 115 |
| Comparative Example 4 | 1,300 | 56.6 | 92,000 | H | 1.4940 | 119 |
| Comparative Example 5 | 880 | 56.9 | 93,100 | F | 1.5592 | 120 |
| Comparative Example 6 | 945 | 57.5 | 75,200 | F | 1.5589 | 118 |
| Comparative Example 7 | 830 | 49.3 | 75,300 | F | 1.5782 | 123 |
| Comparative Example 8 | 1,100 | 56.1 | 63,100 | F | 1.5162 | 137 |
| Comparative Example 9 | 1,200 | 72.4 | 59,300 | H | 1.5149 | 139 |
| Comparative Example 10 | 630 | 75.6 | 94,200 | F | 1.5161 | 119 |
| Comparative Example 11 | 845 | 69.1 | 90,500 | F | 1.5509 | 124 |
| Comparative Example 12 | 910 | 68.4 | 91,400 | F | 1.5560 | 123 |
| Comparative Example 13 | 1,100 | 68.1 | 73,200 | F | 1.5562 | 121 |
| Comparative Example 14 | 1,900 | 98.6 | 91,000 | H | 1.5560 | 116 |
| Comparative Example 15 | 2,100 | 97.9 | 90,000 | H | 1.5570 | 115 |

As shown in Table 2, in Examples 1 to 5, it was confirmed that the purity was high because the content of the residual monomers was 690 ppm or less. It was confirmed that the weight average molecular weight was high. It was confirmed that heat resistance and scratch resistance were excellent because glass transition temperature and pencil hardness were high. And it was confirmed that the coloring property was excellent because the refractive index was low. However, Comparative Example 4 in which the same amount of monomers as in Example 1 were injected, but the temperature of the devolatilization bath was low, the content of the residual monomers was significantly higher than in Example 1. Further, it was confirmed that heat resistance degraded because the glass transition temperature of Comparative Example 4 was lower than that of Example 1.

In addition, Comparative Example 5 in which the same amount of monomers as in Example 1 were injected, but the pressure of the devolatilization bath was high, was found to show markedly high residual monomer content when compared with Example 1. It was confirmed that scratch resistance degraded because pencil hardness of Comparative Example 5 was lower than that of Example 1. It was confirmed that heat resistance degraded because glass transition temperature of Comparative Example 5 was lower than that of Example 1.

In addition, Comparative Example 6 in which the same amount of monomers as in Example 1 were injected, but the temperature of the devolatilization bath was high, was found to show markedly high residual monomer content and low weight average molecular weight when compared with Example 1. It was confirmed that scratch resistance degraded because pencil hardness of Comparative Example 6 was lower than that of Example 1. And it was confirmed that heat resistance degraded because glass transition temperature of Comparative Example 6 was lower than that of Example 1.

In addition, Comparative Example 7 in which a small amount of methyl methacrylate was injected when compared with Example 1, was found to show high residual monomer content, and low polymerization conversion ratio, weight average molecular weight and pencil hardness when compared with Example 1.

In addition, Comparative Examples 14 and 15, in which the same amount of monomers as in Example 1 were injected, but the polymerization methods were different, were found to show markedly high residual monomer content. It was confirmed that heat resistance degraded because glass transition temperature of Comparative Examples 14 and 15 were markedly lower than that of Example 1.

From the results, it was confirmed that a copolymer having excellent purity, scratch resistance, coloring properties and heat resistance might be prepared only if all conditions of the present invention were satisfied.

Meanwhile, Examples 9 to 13, in which N-phenylmaleimide was further included, were found to show large improving effect of heat resistance when compared with Examples 1 to 5. In addition, it was found that Examples 9 and 10, in which the N-phenylmaleimide content was 5 wt % or more, showed large improving effect of heat resistance, and as in Examples 11 to 13, if the amounts of α-methylstyrene, methyl methacrylate, acrylonitrile and N-phenylmaleimide were appropriately controlled, copolymers having excellent heat resistance, scratch resistance and coloring properties were found to be prepared.

However, Comparative Example 11 in which the same amounts of monomers as in Example 9 were injected, but the pressure of the devolatilization bath was high, was found to show markedly high residual monomer content when compared with Example 9. It was confirmed that scratch resistance degraded because hardness of Comparative Example 11 was markedly lower than that of Example 9.

In addition, Comparative Example 12 in which the same amounts of monomers as in Example 9 were injected, but the temperature of the devolatilization bath was low, was found to show markedly high residual monomer content when compared with Example 9. It was confirmed that scratch resistance degraded because hardness of Comparative Example 12 was markedly lower than that of Example 9.

In addition, Comparative Example 13 in which the same amounts of monomers as in Example 9 were injected, but the temperature of the devolatilization bath was high, was found to show markedly high residual monomer content when compared with Example 9. It was confirmed that scratch resistance degraded because hardness was markedly lower than that of Example 9.

In addition, as in Comparative Examples 5 or 6, if the amounts of other monomers were appropriate, but the amount of methyl methacryalte or acrylonitrile was low, it was found to show increased residual monomer content, markedly degraded scratch resistance, and decreased weight average molecular weight.

Meanwhile, Comparative Example 1 which did not include methyl methacrylate, was found to have low weight average molecular weight and low pencil hardness. Comparative Examples 2 to 10, which did not include α-methylstyrene, were found to show high residual monomer content, low weight average molecular weight, and low glass transition temperature. In addition, Comparative Example 3 which used poly(methyl methacrylate) was found to show high residual monomer content, low weight average molecular weight and low glass transition temperature.

The invention claimed is:

1. A copolymer, comprising:
    41.67-51.89 wt % of α-methylstyrene;
    18.87-29.76 wt % of methyl methacrylate;
    23.81-28.30 wt % of acrylonitrile; and
    0.94 to 4.76 wt % of N-phenylmaleimide, based on a total weight of the copolymer,
    wherein the residual monomer content is 550-590 ppm
    wherein the refractive index of the copolymer is 1.51.

2. The copolymer according to claim 1, wherein a weight average molecular weight of the copolymer is 75,000 to 120,000 g/mol.

3. A method for preparing a copolymer according to claim 1, comprising:
    performing continuous bulk polymerization of a monomer mixture in four or more reactors; and
    volatilizing unreacted monomers and solvent from the polymerization product obtained by polymerization reaction in a devolatilization bath to separate a copolymer,
    and
    wherein the devolatilization bath has a temperature of 223 to 252° C., and a pressure of 20 torr or less.

4. The method for preparing a copolymer according to claim 3, wherein the continuous bulk polymerization is performed at 100 to 120° C.

5. The method for preparing a copolymer according to claim 3, wherein the devolatilization bath has a temperature of 225 to 250° C., and a pressure of 18 torr or less.

* * * * *